United States Patent
Tang et al.

(10) Patent No.: US 10,861,486 B1
(45) Date of Patent: Dec. 8, 2020

(54) WRITER WITH NARROWER HIGH MOMENT TRAILING SHIELD

(71) Applicant: Headway Technologies, Inc., Milpitas, CA (US)

(72) Inventors: Yuhui Tang, Milpitas, CA (US); Ying Liu, San Jose, CA (US)

(73) Assignee: Headway Technologies, Inc., Milpitas, CA (US)

(*) Notice: Subject to any disclaimer, the term of this patent is extended or adjusted under 35 U.S.C. 154(b) by 0 days.

(21) Appl. No.: 16/507,179

(22) Filed: Jul. 10, 2019

(51) Int. Cl.
| | |
|---|---|
| *G11B 5/31* | (2006.01) |
| *G11B 5/265* | (2006.01) |
| *G11B 5/11* | (2006.01) |
| *G11B 5/105* | (2006.01) |
| *G11B 5/127* | (2006.01) |
| *G11B 5/00* | (2006.01) |
| *G11B 5/23* | (2006.01) |

(52) U.S. Cl.
CPC ............ *G11B 5/2655* (2013.01); *G11B 5/105* (2013.01); *G11B 5/11* (2013.01); *G11B 5/1278* (2013.01); *G11B 5/312* (2013.01); *G11B 5/315* (2013.01); *G11B 5/3133* (2013.01); *G11B 5/3146* (2013.01); *G11B 5/23* (2013.01); *G11B 5/3153* (2013.01); *G11B 2005/0021* (2013.01); *G11B 2005/0024* (2013.01)

(58) Field of Classification Search
CPC ..... G11B 5/1278; G11B 5/314; G11B 5/3146; G11B 5/315
USPC ........................................................ 360/125.3
See application file for complete search history.

(56) References Cited

U.S. PATENT DOCUMENTS

| | | | |
|---|---|---|---|
| 6,785,092 B2 | 8/2004 | Covington et al. | |
| 7,589,600 B2 | 9/2009 | Dimitrov et al. | |
| 7,957,098 B2 | 6/2011 | Yamada et al. | |
| 8,320,079 B2 | 11/2012 | Iwasaki et al. | |
| 8,446,690 B2 | 5/2013 | Alex et al. | |
| 8,498,079 B1 | 7/2013 | Song et al. | |
| 8,995,088 B1 * | 3/2015 | Boone ...................... | G11B 5/31 |
| 9,558,765 B2 | 1/2017 | Zhang et al. | |
| 9,626,990 B2 | 4/2017 | Tang et al. | |
| 9,747,932 B1 * | 8/2017 | Taguchi ................. | G11B 5/235 |
| 10,032,470 B1 * | 7/2018 | Degawa ................. | G11B 5/315 |
| 10,121,497 B1 | 11/2018 | Takahashi et al. | |
| 10,210,888 B1 * | 2/2019 | Li ........................ | G11B 5/3116 |
| 10,366,714 B1 * | 7/2019 | Olson .................... | G11B 5/314 |
| 10,446,178 B1 * | 10/2019 | Tang ........................ | G11B 5/21 |
| 10,522,178 B1 * | 12/2019 | Liu ............................ | G11B 5/11 |
| 10,714,129 B1 * | 7/2020 | Tang ....................... | G11B 5/115 |
| 2009/0080106 A1 | 3/2009 | Shimizu et al. | |

(Continued)

*Primary Examiner* — Jefferson A Evans
(74) *Attorney, Agent, or Firm* — Saile Ackerman LLC; Stephen B. Ackerman

(57) ABSTRACT

A PMR (perpendicular magnetic recording) write head configured for microwave assisted magnetic recording (MAMR) includes a spin-torque oscillator (STO) and trailing shield formed of high moment magnetic material (HMTS). By patterning the STO and the HMTS in a simultaneous process the HMTS and the STO layer are precisely aligned and have very similar cross-track widths. In addition, the write gap at an off-center location has a thickness that is independent from its center-track thickness and the write gap total width can have a flexible range whose minimum value is the same width as the STO width.

9 Claims, 6 Drawing Sheets

(56) References Cited

U.S. PATENT DOCUMENTS

| | | | |
|---|---|---|---|
| 2012/0295132 A1* | 11/2012 | Min | G11B 5/1278 |
| | | | 428/812 |
| 2015/0043106 A1* | 2/2015 | Yamada | G11B 5/1278 |
| | | | 360/123.05 |
| 2016/0148627 A1* | 5/2016 | Nagasaka | G11B 5/35 |
| | | | 360/123.05 |
| 2016/0218728 A1* | 7/2016 | Zhu | G11B 5/235 |
| 2017/0061995 A1* | 3/2017 | Taguchi | G11B 5/3153 |
| 2017/0133044 A1* | 5/2017 | Lim | G11B 5/315 |
| 2018/0025746 A1 | 1/2018 | Okamura et al. | |
| 2018/0075868 A1 | 3/2018 | Koui et al. | |
| 2019/0259413 A1* | 8/2019 | Le | G11B 5/3116 |
| 2019/0279665 A1* | 9/2019 | Li | G11B 5/3146 |

* cited by examiner

WRITER WITH NARROWER HIGH MOMENT TRAILING SHIELD

RELATED PATENT APPLICATIONS

This application is related to Ser. No. 16/507,177, Filing Date Jul. 10, 2019, which is assigned to a common assignee and herein incorporated by reference in its entirety.

1. Technical Field

This disclosure relates generally to a thin-film magnetic writer used in microwave assisted magnetic recording (MAMR) to write on highly coercive recording disks and particularly to the design of magnetic shields for such a writer.

2. Background

To further increase the magnetic recording density of a hard disk drive (HDD) system, there have been growing demands for the improvements in the performance of thin film magnetic heads. A perpendicular magnetic recording (PMR) head combining a single pole writer with a tunneling magnetoresistive (TMR) reader provides a high writing field and a large read-back signal, thus a higher areal density can be achieved. Increasing the magnetic recording areal density requires smaller grain size in the magnetic recording media, which in turn reduces storage lifetime due to thermal instabilities. In order to maintain durable storage lifetime, the thermal stability (energy barrier $\Delta=KV/k_b T$) has to be increased. In the formula, $k_b T$ is the Boltzmann constant, T is the temperature in Kelvin, V is the average grain size of the storage media, K, magnetic anisotropy, is equal to $H_k M_s/2$, where $H_k$ is the magnetic anisotropy field and $M_s$ is the saturation magnetization of the magnetic recording media. For smaller grain size media, K has to be increased to maintain the same thermal stability for storage, thus $H_k$ is greatly increased causing the magnetic media to have high coercivity $H_c$. As a consequence, the magnetic field generated by the magnetic writer main pole as well as the current from the coil around the main pole may not be strong enough to switch the magnetic media bits for data recording.

One way to address this magnetic recording dilemma is by heat-assisted magnetic recording (HAMR). The purpose of HAMR is to use heat energy to reduce the energy barrier ($\Delta=KV/k_b T$) of the grains of the magnetic recording media while writing the data with magnetic recording field. During data writing, a magnetic bit in the media is heated by the application of laser-generated optical energy, in the form of surface-plasmon near-fields, causing the temperature of the magnetic bit to rise. When the temperature of the bit is significantly elevated, it can be reversed in polarity by the applied magnetic field due to a reduction in the energy barrier $\Delta$. Once the bit polarity is changed, both the heating source and the applied field are quickly withdrawn. As the temperature reverts to room temperature, the switched state of the bit is stored in the magnetic recording media.

Another approach to addressing the magnetic recording dilemma, and the subject of this disclosure, is the application of microwave assisted magnetic recording (MAMR). In microwave-assisted magnetic recording (MAMR), the energy barrier that prevents the polarity of a magnetic bit from being reversed is not reduced by optical heating, but rather by supplying it with resonant energy from an external oscillating magnetic field produced by an additional layer (actually, a multi-layered element, but is here simply denoted a layer) called a spin-torque oscillator (STO). Note, the structure and operation of the STO is well known in the art and it will not be discussed further herein. This STO layer is positioned within a gap region that surrounds the main magnetic pole.

The STO is usually aligned with the main pole (MP) cross-track width in order to maximize the performance. A high moment trailing shield (HMTS or, more simply, an HS) is used to attract the MP field back to the trailing side of the MP to improve the bits per inch (BPI) of the recording process. In conventional designs, the high moment trailing shield is much wider than MP in cross-track dimension. At least two problems are related to this prior-art wider width:
1. The wider HMTS has greater protrusion than surrounding shields, exposing the STO to additional reliability concerns.
2. A wider HMTS induces more magnetic charge in the write gap corner, and will cause a stronger stray field.

The prior arts have taken some steps to address these difficulties. However, they do not disclose the approach and method to be described in this disclosure nor do they treat the problem with the same degree of success as is done herein.

SUMMARY

It will be an object of the present disclosure to provide a PMR (perpendicular magnetic recording) writer incorporated within a MAMR (microwave assisted magnetic recording) configuration in which a new design for a HMTS (high moment trailing shield) eliminates problems associated with the designs of the prior art.

Specifically, in this new design, the high moment trailing shield has similar cross-track width as MP and STO and has smaller cross-track width than the write gap. The write gap is conformal along the cross-track direction, and outside the width of high moment trailing shield, lower moment shielding material will be used. The down-track thickness of the high moment trailing shield can also be reduced for less protrusion. This new design will have two major benefits:
(1) less HMTS protrusion for better STO reliability, and
(2) reduced adjacent track interference (ATI) due to less magnetic coupling at the write gap cross track edge.

These benefits are the result of several dimensional improvements that the disclosed design provides as compared to the designs of the prior art. Among these improvements are a wider cross-track width for the write gap than PWA ("pole width A", which is the MP ABS cross-track width at its widest edge) and STO widths, the write gap width ranging from 100 nm to 1 μm. In addition, the disclosed high moment trailing shield (HMTS) has a narrower cross-track width than write gap, being preferably aligned with the STO width, and that width can range from 10 nm to 500 nm. Further, the disclosed high moment trailing shield (HMTS) can be thinner in the down-track direction than prior-art structures, the thickness now ranging from 5 nm to 500 nm.

These advantages are all embodied in the perpendicular magnetic writer (PMR) configured for microwave assisted magnetic recording (MAMR) that is disclosed herein. This writer includes a magnetic main pole (MP) that emerges at an air-bearing surface (ABS) and has a generally trapezoidal ABS face that is wider at a trailing-edge surface than at a leading-edge surface. The trailing-edge and leading-edge surfaces are connected by mirror-image symmetrically formed side edge surfaces to complete the trapezoidal cross-section.

A dielectric layer conformally surrounds the MP and forms a uniform gap between both side edge surfaces of said MP and the leading edge surface of the MP. This dielectric layer has an upper planar surface that is coplanar with the trailing edge surface of the MP and extends symmetrically away from the MP, forming uniform gaps.

A multi-layered spin-torque oscillator (STO) is formed on the trailing edge side of the MP. The STO has the same width as the trailing edge side and is aligned with it. A high-moment trailing shield (HMTS) is formed on the STO, having the same width as the STO and being aligned with it. A write gap (WG) layer of uniform thickness is formed on the upper planar surface of the dielectric layer, the layer extending symmetrically from contiguity with left and write edges of the combined STO and HMTS layers.

BRIEF DESCRIPTION OF THE DRAWINGS

FIG. 2A is a plot of the perpendicular magnetic write field, Hy, in Oe, vs HS CT width in nm.

FIG. 2B is a plot of the erasure width under AC writing (EWAC) in nm vs. HS CT width in nm.

FIG. 2C is a plot of trailing shield (TS) return field in Oe vs. HS CT width in nm.

DETAILED DESCRIPTION

Figure 1A:
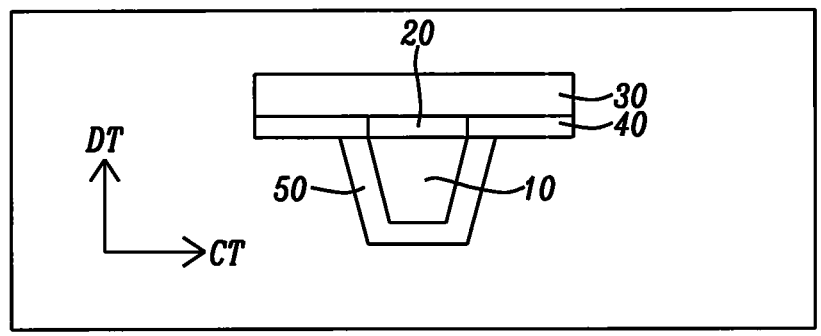
FIG. 1A is a schematic illustration of an ABS view of a typical MAMR writer head of the prior art.
Figure 1B:
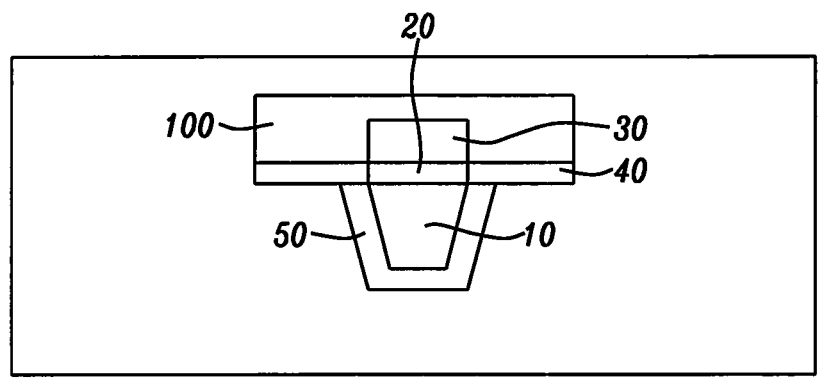
FIG. 1B is a schematic illustration of an ABS view of the MAMR writer head of the present disclosure.

Referring first to the schematic ABS view of FIG. 1A, there is shown a prior art MAMR writer design. Referring next to FIG. 1B, there is shown a schematic ABS view of the disclosed new MAMR design. In both figures the trapezoidal ABS face of the main magnetic pole (MP) is designated as 10, the spin torque oscillator (STO) is designated as 20, the high moment trailing shield (HMTS) is designated as 30 the write-gap (WG) is designated as 40 and the side gap (SG) is designated as 50. A trailing shield, of lower moment material, surrounds the upper portion of the writer and is designated 100. FIG. 1A has a pair of vectors showing the down-track direction (DT) and the cross-track direction (CT).

In the new design of FIG. 1B, the HMTS can shrink its size in both its down-track dimension (DT-direction) and cross track dimension (CT-direction).

To confirm the writing performance of the new writer design, a series of finite-element method (FEM) simulations have been carried out and their results are shown in FIGS. 2A-2C, 3A-3C and 4.

Figure 2A:
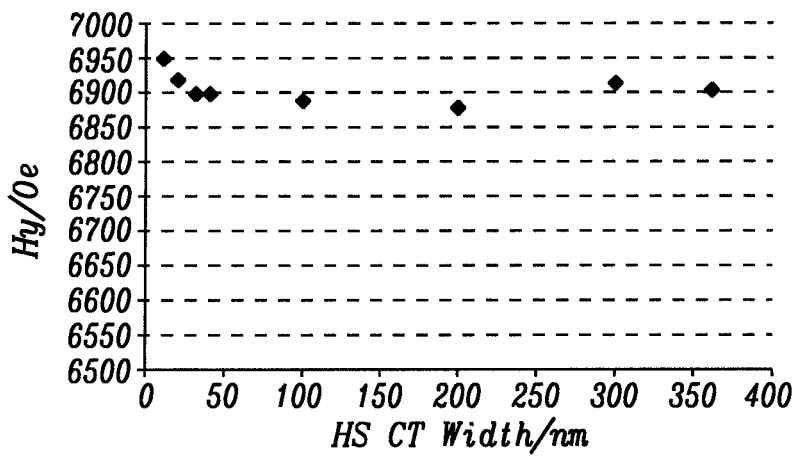
FIGS. 2A-2C illustrate the results of three finite element method (FEM) simulations that illustrate the performance of the disclosed writer, with the STO current turned off, under three different high-moment trailing shield (HMTS) cross-track (CT) widths. The HMTS down-track (DT) thickness is fixed at 70 nm while the HMTS CT width (HSw) is continuously varied from 360 nm to 10 nm. Note, the "high moment trailing shield" is referred to as HS in these figures.
Figure 2B:
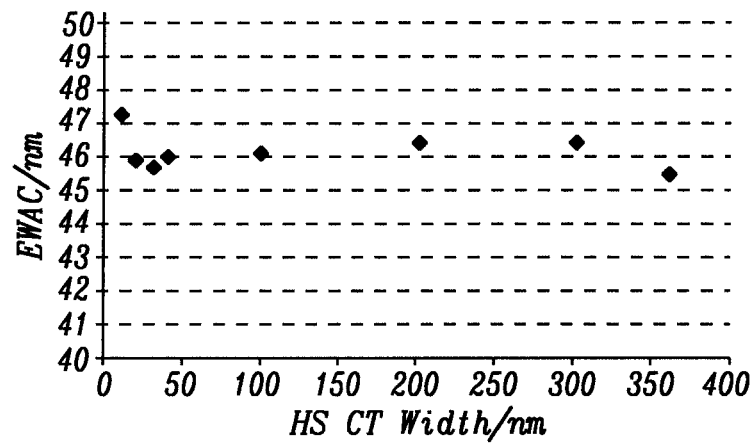
Figure 2C:
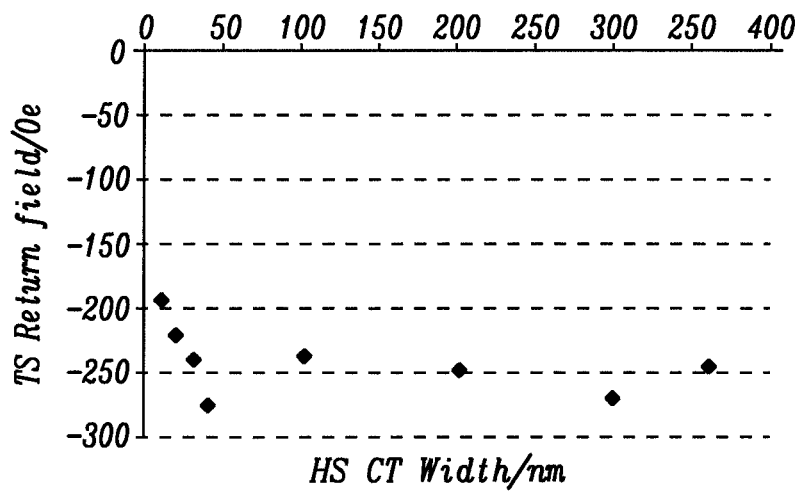

The simulation of FIG. 2A-2C is based on a MAMR writer (see FIG. 1B) with STO 20 current turned off. The PWA (Pole Width at the widest cross-track dimension of the pole, 10) is 40 nm, the side gap thickness (SG, 50) is 35 nm, the write gap (WG, 40) thickness is 17 nm, the write gap (WG 40) cross-track width is fixed at 360 nm. The simulation allows the HS CT width (cross-track width of the high-moment trailing shield 30) to be swept from 360 nm, which is the width of a prior art writer (such as FIG. 1A) used for comparison, to a much narrower value of 10 nm. FIG. 2A is a plot of magnetic field, Hy (Oe), vs. trailing shield cross-track width (HS CT Width/nm), FIG. 2B is a plot of EWAC (Erasure Width with AC writing) vs. trailing shield cross-track width and FIG. 2C is a plot of the trailing shield return field as a function of trailing shield cross-track width. As can be seen, a width of 30 nm in each of the figures reproduces the various performance characteristics of the prior-art writer.

The significance of the above figures is as follows. With the same write field, Hy, a smaller EWAC indicates a potententially improved TPI (tracks per inch). The return field represents the strength of the field that passes through the recording media and returns to the trailing shield. A more negative return field indicates a better BPI (bits per inch). It is to be noted that the magnetic material of the high-moment trailing shield (HMTS) typically has a Bs of 24 kG (kiloGauss), but it can range from approximately 18 kG to 24 kG. Ordinary trailing shield material has a Bs of 16 kG, but it may range from approximately 1 kG to 18 kG. We note also that the write gap, WG 40 has a wider cross-track width than the maximum width of the pole, PWA, ranging from 100 nm to 1 μm. The HMTS has a narrower cross-track width than the WG 40, being preferably aligned with the STO width, but can range from approximately 10 nm to 500 nm. The HMTS can have a thinner down-track thickness than the prior-art structure used for comparison purposes, ranging from approximately 5 nm to 500 nm.

Figure 3A:
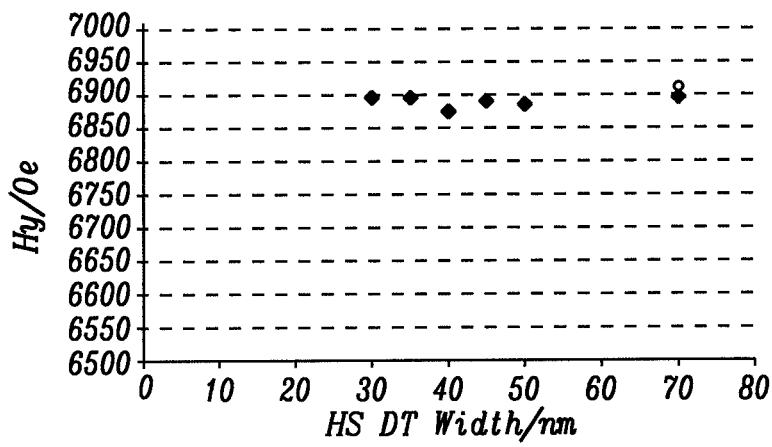
FIG. 3A-3C are the results of a FEM simulation in which the presently disclosed writer is again simulated, but now there are three different HS down-track (DT) thicknesses (HSt) while the HS CT width is fixed at 40 nm. HSt is continuously varied from 70 nm to 30 nm.

Referring next to a simulation that was performed and whose results are shown in FIG. 3A. In this simulation of the Hy return field the writer has its STO turned off under different high moment trailing shield down track (HMTS DT) thicknesses. The high moment trailing shield cross-track (HMTS CT) width is fixed at 40 nm. The circular data point corresponds to a comparison prior-art writer with the high moment trailing shield width (HMTS w) being approximately 360 nm and the high moment trailing shield thickness (HMTS t) being approximately 70 nm.

Figure 3B:
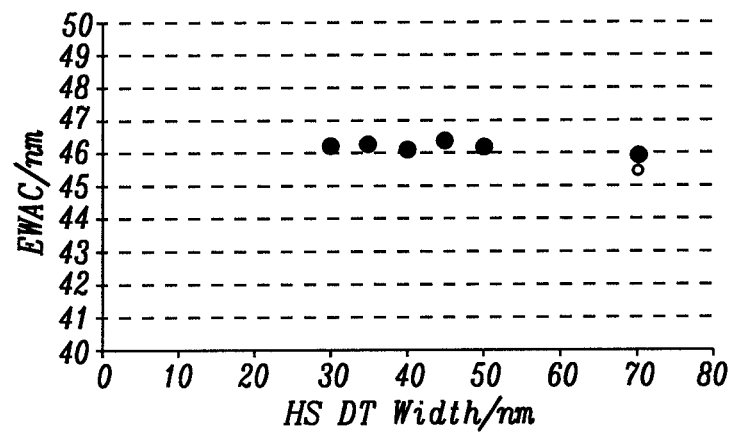
Figure 3C:
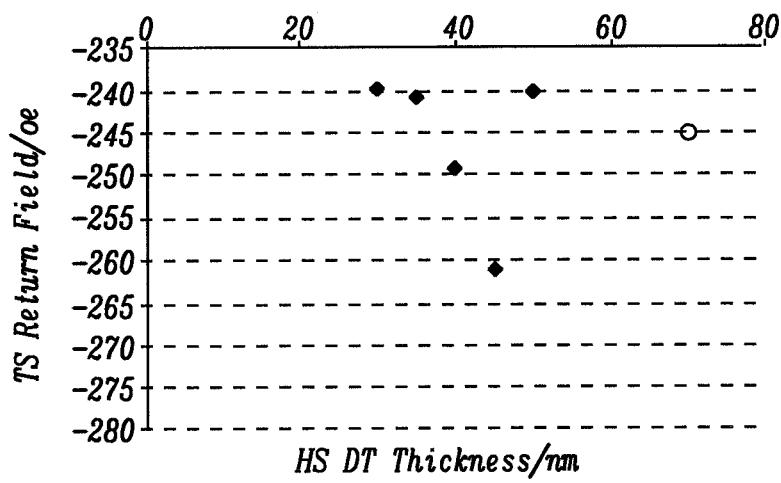

FIGS. 3B and 3C are plots of EWAC and HMTS return field respectively. The results of these three simulations indicate that an HSw above 30 nm can preserve similar TS return field and EWAC as the comparison prior-art writer.

Figure 4:
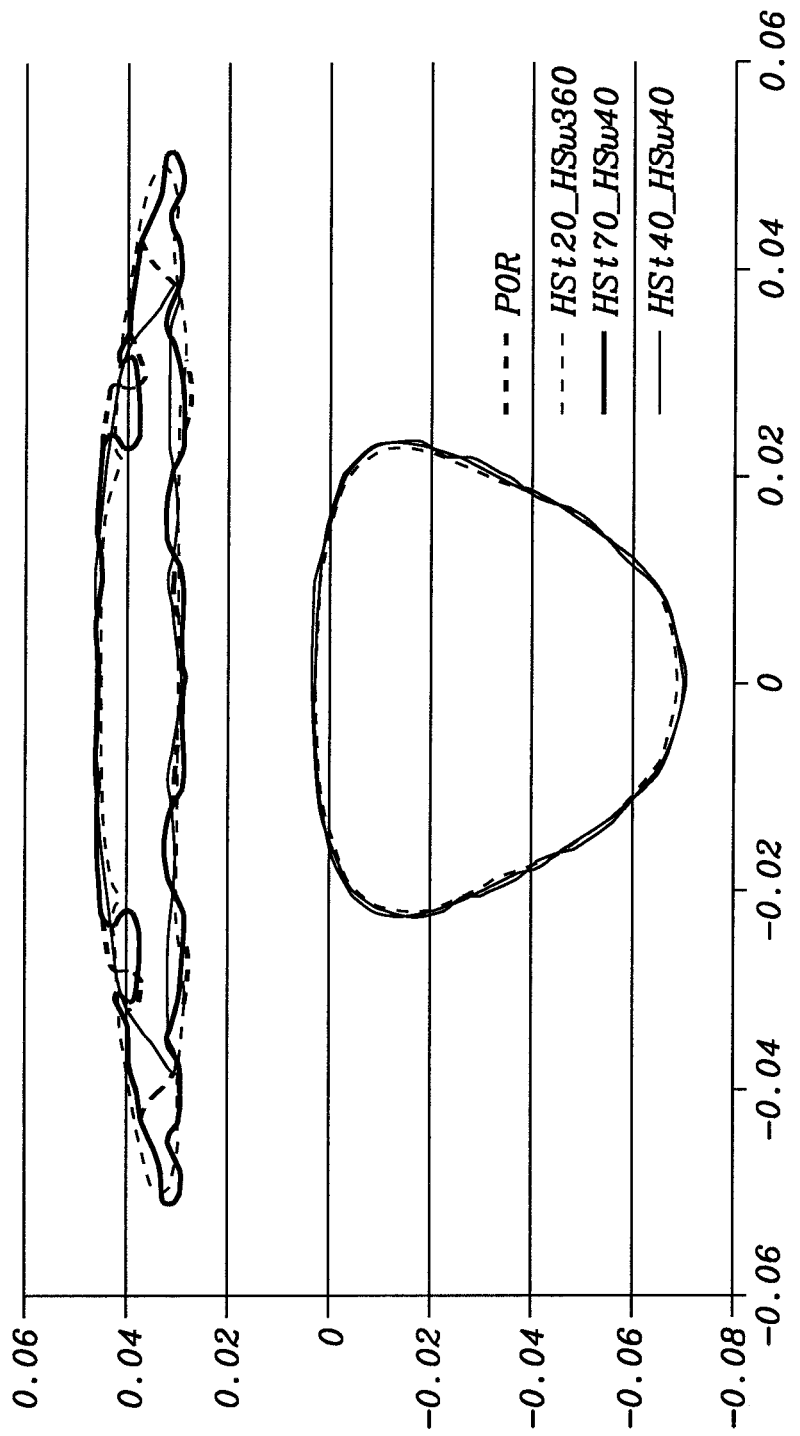
FIG. 4 is a set of simulated contour lines with the perpendicular field, Hy, at 5000 Oe and the trailing shield return field at −200 Oe, for four different designs.

Referring finally to FIG. 4 there is shown simulated contour lines of Hy (the magnetic write field) at 5000 Oe and a trailing shield return field at −200 Oe with different designs. The design labeled POR is the presently used (prior-art) writer, the remaining three designs represent the disclosed writer at three different simulated shield configurations. Basically, the presently disclosed writer design produces the performance characteristics of the POR design.

Figure 5:
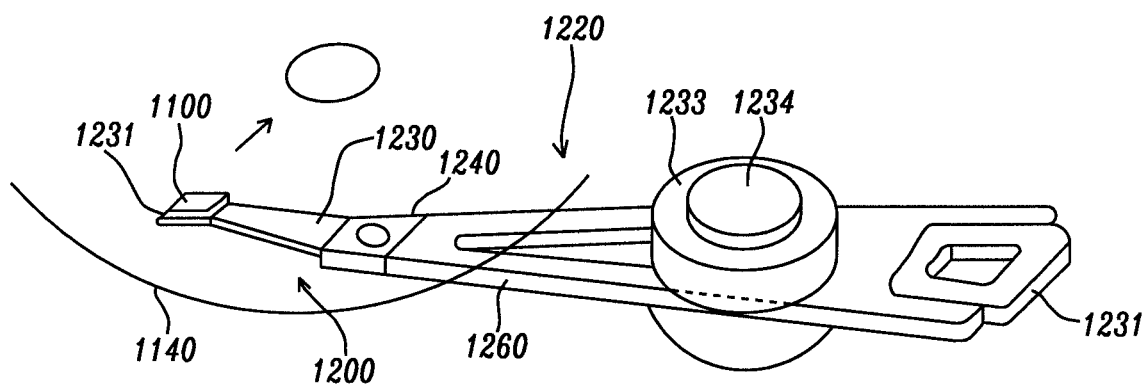
FIG. 5 schematically shows a perspective view of a head gimbal assembly of the present recording apparatus.

FIG. 5 shows a head gimbal assembly (HGA) 1200 that includes a slider-mounted PMR writer 1100, the slider now providing aerodynamic support to the writer when it moves above or below an operational disk recording medium 1140. There is also shown a suspension 1220 that elastically supports the slider-mounted writer 1100. The suspension 1220 has a spring-like load beam 1230 made with a thin, corrosion-free elastic material like stainless steel. A flexure 1230 is provided at a distal end of the load beam and a base-plate 1240 is provided at the proximal end. The slider mounted TAMR writer 1100 is attached to the load beam 1230 at the flexure 1231 which provides the TAMR with the proper amount of freedom of motion. A gimbal part for maintaining the PMR read/write head at a proper level is provided in a portion of the flexure 1231 to which the TAMR 1100 is mounted.

A member to which the HGA 1200 is mounted to arm 1260 is referred to as head arm assembly 1220. The arm 1260 moves the read/write head 1100 in the cross-track direction (arrow) across the medium 1140 (here, a hard disk). One end of the arm 1260 is mounted to the base plate 1240. A coil 1231 to be a part of a voice coil motor (not shown) is mounted to the other end of the arm 1260. A bearing part 1233 is provided to the intermediate portion of the arm 1260. The arm 1260 is rotatably supported by a shaft 1234 mounted to the bearing part 1233. The arm 1260 and the voice coil motor that drives the arm 1260 configure an actuator.

Figure 6:
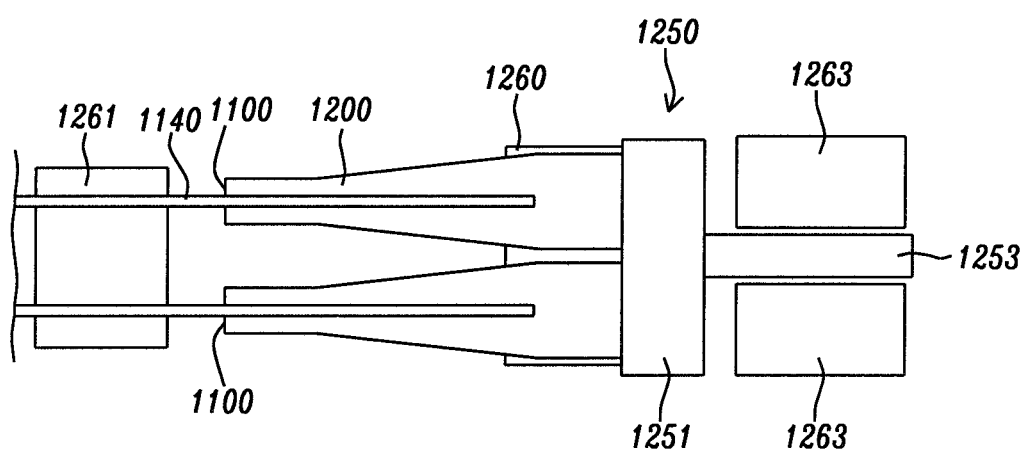
FIG. 6 schematically shows a side view of a head stack assembly of the present recording apparatus.
Figure 7:
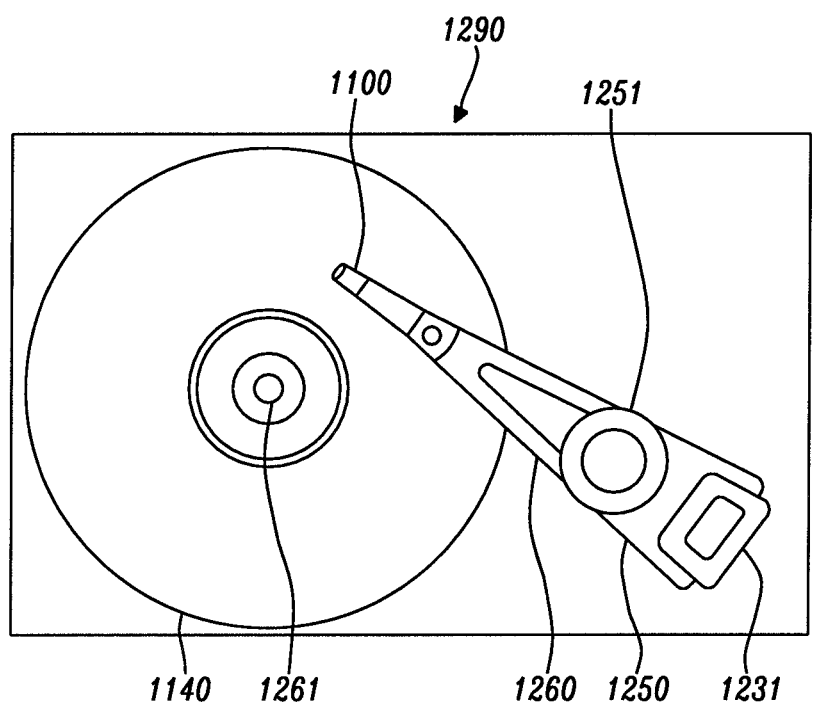
FIG. 7 schematically shows a plan view of the magnetic recording apparatus within which are mounted the components shown in FIGS. 5 and 6.

Referring next to FIG. 6 and FIG. 7, there is shown a head stack assembly 1250 and a magnetic recording apparatus in which the slider-mounted TAMR writer 1100 is contained. The head stack assembly is an element to which the HGA 1200 is mounted to arms of a carriage having a plurality of arms for engaging with a plurality of disks 1140. The plurality of disks are mounted on a spindle 1261. FIG. 6 is a side view of this assembly and FIG. 7 is a plan view of the entire magnetic recording apparatus.

Referring finally to FIG. 7, the head stack assembly 1250 is shown incorporated into a magnetic recording apparatus 1290. The magnetic recording apparatus 1290 has a plurality of magnetic recording media 1114 mounted on a spindle motor 1261. Each individual recording media 1114 has two TAMR elements 1100 arranged opposite to each other across the magnetic recording media 14 (shown clearly in FIG. 5). The head stack assembly 1250 and the actuator (except for the write head itself) act as a positioning device and support the PMR heads 1100. They also position the PMR heads correctly opposite the media surface in response to electronic signals. The read/write head records information onto the surface of the magnetic media by means of the magnetic pole contained therein.

As is finally understood by a person skilled in the art, the detailed description given above is illustrative of the present disclosure rather than limiting of the present disclosure. Revisions and modifications may be made to methods, materials, structures and dimensions employed in forming and providing a PMR writer configured for MAMR operation having a high moment trailing shield (HMTS) that is aligned with a spin torque oscillator layer (STO), while still forming and providing such a structure and its method of formation in accord with the spirit and scope of the present invention as defined by the appended claims.

We claim:

1. A perpendicular magnetic writer (PMR) configured for microwave assisted magnetic recording (MAMR), comprising:

a magnetic main pole (MP) emerging at an air-bearing surface (ABS) and having a trapezoidal ABS face that is wider at a trailing edge surface than at a leading edge surface and wherein said trailing and leading edge surfaces are connected by symmetrically formed side edge surfaces;

a dielectric layer conformally surrounding said MP and forming a uniform gap between both side edge surfaces of said MP and said leading edge surface of said MP; wherein said dielectric layer has an upper planar surface that is coplanar with said trailing edge surface of said MP and that extends symmetrically away from said MP from said uniform gaps;

a spin-torque oscillator (STO) formed on the trailing edge side of said MP and having the same width as said trailing edge side and aligned with it;

a high-moment trailing shield (HMTS) formed on said STO layer and having the same width of said STO layer and aligned with it; wherein said HMTS is a layer of high moment magnetic material having a Bs between approximately 18 kG and 24 kG; and wherein said HMTS layer has a width between 10 nm and 360 nm; and a write gap (WG) layer formed on said upper planar surface of said dielectric layer and having a uniform thickness, said layer extending symmetrically from contiguity with left and right edges of the combined STO and HMTS layers.

2. The PMR of claim 1 including a trailing shield formed contacting top and side edges of said write gap layer, the top edge of said HMTS, and the top planar surface of said dielectric layer that extends symmetrically and laterally beyond said WG layer.

3. The PMR of claim 1 wherein said WG has a wider cross-track width than PWA, the maximum width of the pole, said width ranging between approximately 100 nm and 1 μm.

4. The PMR of claim 1 wherein said WG layer is a layer of non-magnetic material and wherein the minimum total width of said WG layer is the width of said STO and the maximum width can vary between approximately 10 nm and 1 μm.

5. The PMR of claim 1 wherein off-center WG thickness can range between approximately 2 nm and 50 nm.

6. The PMR of claim 1 wherein said HMTS has a narrower width than the WG and is aligned with said STO, but wherein said HMTS width can range between approximately 10 nm and 500 nm.

7. The PMR of claim 1 wherein said HMTS can have a thinner down-track thickness than a prior-art structure of otherwise similar design, while reproducing a performance of said prior-art structure, said thickness ranging from between approximately 5 nm and 500 nm.

8. A head gimbal assembly, comprising the PMR write head of claim 1 mounted on a slider;

a suspension that elastically supports said slider-mounted PMR read/write head, wherein said suspension has a flexure to which said slider-mounted PMR read/write head is joined, a load beam with one end connected to said flexure and a base plate connected to the other end of said load beam.

9. A HDD (Hard Disk Drive), comprising:

the head gimbal assembly of claim 8;

a magnetic recording medium positioned opposite to said slider-mounted TAMR;

a spindle motor that rotates and drives said magnetic recording medium;

a device that supports the slider and that positions said slider relative to said magnetic recording medium.

* * * * *